(12) United States Patent
Mulligan

(10) Patent No.: US 7,914,086 B2
(45) Date of Patent: Mar. 29, 2011

(54) TRACK IDLER WITH REPLACEABLE WEAR PADS

(75) Inventor: Patrick J. Mulligan, Dubuque, IA (US)

(73) Assignee: Deere & Company, Moline, IL (US)

( * ) Notice: Subject to any disclaimer, the term of this patent is extended or adjusted under 35 U.S.C. 154(b) by 144 days.

(21) Appl. No.: 12/257,733

(22) Filed: Oct. 24, 2008

(65) Prior Publication Data

US 2010/0102623 A1 Apr. 29, 2010

(51) Int. Cl.
*B62D 55/14* (2006.01)
(52) U.S. Cl. .......................... 305/137; 305/199
(58) Field of Classification Search .................. 305/136, 305/137, 199; 295/15, 20; 152/300, 305, 152/306; 301/43, 44.1, 44.3, 44.4, 52
See application file for complete search history.

(56) References Cited

U.S. PATENT DOCUMENTS

| | | | | |
|---|---|---|---|---|
| 644,288 A * | 2/1900 | Frost | .............................. | 152/305 |
| 689,521 A * | 12/1901 | Titus | .............................. | 474/185 |
| 748,256 A * | 12/1903 | Birdsall | ....................... | 152/307 |
| 785,034 A * | 3/1905 | Duff | ................................ | 295/19 |
| 854,463 A * | 5/1907 | Carhart | ......................... | 152/306 |
| 1,094,706 A * | 4/1914 | Dellert | ........................... | 152/300 |
| 1,314,462 A * | 8/1919 | Breeze | ........................... | 152/303 |
| 1,610,731 A * | 12/1926 | Barth | ....................... | 301/64.304 |
| 1,963,859 A * | 6/1934 | Micheal | ........................... | 295/15 |
| 3,606,497 A | 9/1971 | Gilles | | |
| 3,960,412 A | 6/1976 | Shuler | | |
| RE30,039 E | 6/1979 | Clemens et al. | | |
| 4,736,534 A | 4/1988 | Daniels et al. | | |
| 4,752,281 A | 6/1988 | Lammers | | |
| 4,818,041 A * | 4/1989 | Oertley | ......................... | 305/137 |
| 4,840,438 A | 6/1989 | Cory | | |
| 4,881,930 A | 11/1989 | Oertley | | |
| 5,026,329 A | 6/1991 | Diekevers | | |
| 5,078,454 A * | 1/1992 | Rollinson | ..................... | 301/44.1 |
| 5,667,020 A | 9/1997 | Palmer et al. | | |
| 6,012,784 A * | 1/2000 | Oertley | ......................... | 305/137 |
| 6,540,630 B1 | 4/2003 | Oertley | | |
| 6,631,961 B1 * | 10/2003 | Bedford et al. | ............... | 305/136 |
| 6,652,043 B2 * | 11/2003 | Oertley | ......................... | 305/137 |
| 6,739,678 B2 * | 5/2004 | Moebs et al. | ................. | 305/136 |
| 6,899,651 B2 | 5/2005 | Oertley | | |
| 2008/0217994 A1* | 9/2008 | McRae et al. | ................. | 305/199 |

OTHER PUBLICATIONS

Statement of Prior Art (1 page).
Track Idler of John Deere 850J Crawler (1 page).

* cited by examiner

*Primary Examiner* — Russell D Stormer (57) ABSTRACT

An idler for use with an endless track of a track-type vehicle comprises a wheel and a rim. The rim comprises fasteners and replaceable wear pads releasably mounted to and positioned about the periphery of the wheel using the fasteners.

15 Claims, 5 Drawing Sheets

TRACK IDLER WITH REPLACEABLE WEAR PADS

FIELD OF THE DISCLOSURE

The present disclosure relates to an idler for use with an endless track of a track-type vehicle.

BACKGROUND OF THE DISCLOSURE

Track-type vehicles (e.g., crawlers, excavators, tracked tree-felling machines) have an undercarriage typically with at least one track on each side of the vehicle. Each track typically includes an endless track chain, with ground-engaging shoes mounted thereon, trained about a drive sprocket, rollers, and one or more idlers.

SUMMARY OF THE DISCLOSURE

According to the present disclosure, there is provided an idler for use with an endless track of a track-type vehicle. The idler comprises a wheel and a rim. The rim comprises fasteners and replaceable wear pads releasably mounted to and positioned about the periphery of the wheel using the fasteners. As such, when a pad becomes worn, it can be replaced in the field with a fresh pad, while the track remains intact, without scrapping the entire idler, maximizing idler life.

In an embodiment, the fasteners are readily accessible laterally from the side of the idler to enhance the serviceability of the idler. More particularly, each of the fasteners extends in its longitudinal dimension laterally relative to the wheel (or, stated otherwise, axially relative to an axis about which the wheel is rotatable). As such, the heads of the fasteners are positioned on the same side of the idler, for ready and quick access thereto by a person with a tool (e.g., air gun) to remove the fasteners of a wear pad to be replaced or re-conditioned.

To facilitate such side access to the fasteners, the wear pads may be arranged to provide a first ring of wear pads and a second ring of wear pads. The first and second rings are laterally adjacent to and mate against one another. The fasteners fasten the wear pads of the first ring to the wear pads of the second ring.

The wear pads of the first ring and the wear pads of the second ring may be arranged relative to one another in a manner that promotes the homogeneity of the rim. The interfaces between circumferentially adjacent wear pads of the first ring are staggered circumferentially relative to the interfaces between circumferentially adjacent wear pads, of the second ring. There is thus no interface between wear pads extending laterally all the way from one side of the rim to the other side of the rim, so as to minimize stress concentrations along the rim. Such rim homogeneity promotes the rim's facilities for bearing loads and noise minimization.

In another embodiment, each fastener is used in an efficient manner to fasten wear pads to the wheel. In this embodiment, the wear pads are aligned circumferentially about the periphery of the wheel using the fasteners. Each fastener extends in a respective interface between circumferentially adjacent wear pads. The circumferentially adjacent wear pads cooperate to define a fastener-receiving aperture receiving a respective one of the fasteners. Each fastener thus efficiently mounts adjacent ends of two circumferentially adjacent wear pads.

The-above and other features will become apparent from the following description and the attached drawings.

BRIEF DESCRIPTION OF THE DRAWINGS

The detailed description of the drawings refers to the accompanying figures in which.

DESCRIPTION OF THE DRAWINGS

Figure 1:
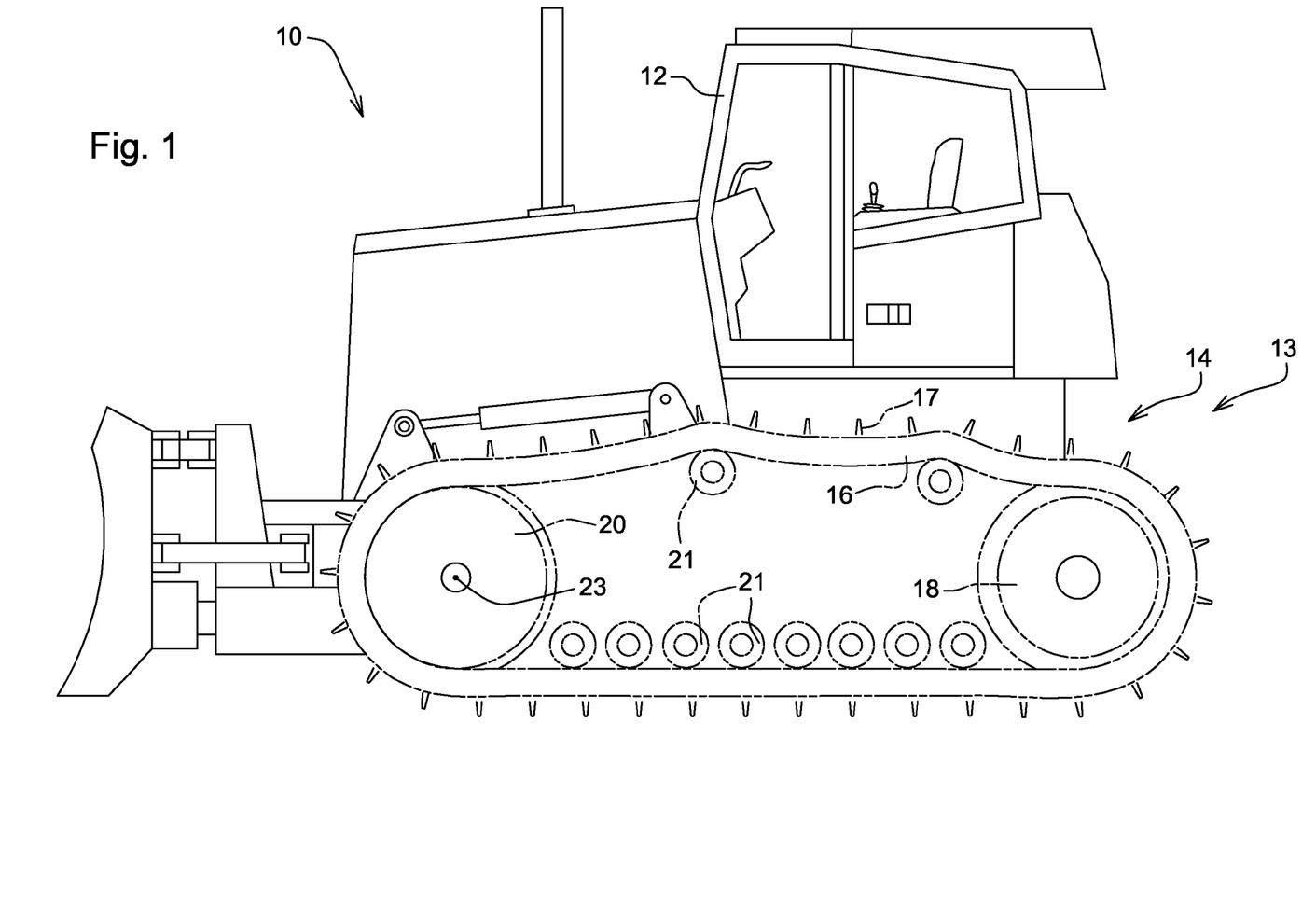
FIG. 1 is a side elevation view of a simplified track-type vehicle showing its undercarriage diagrammatically.
Figures 2, 3:
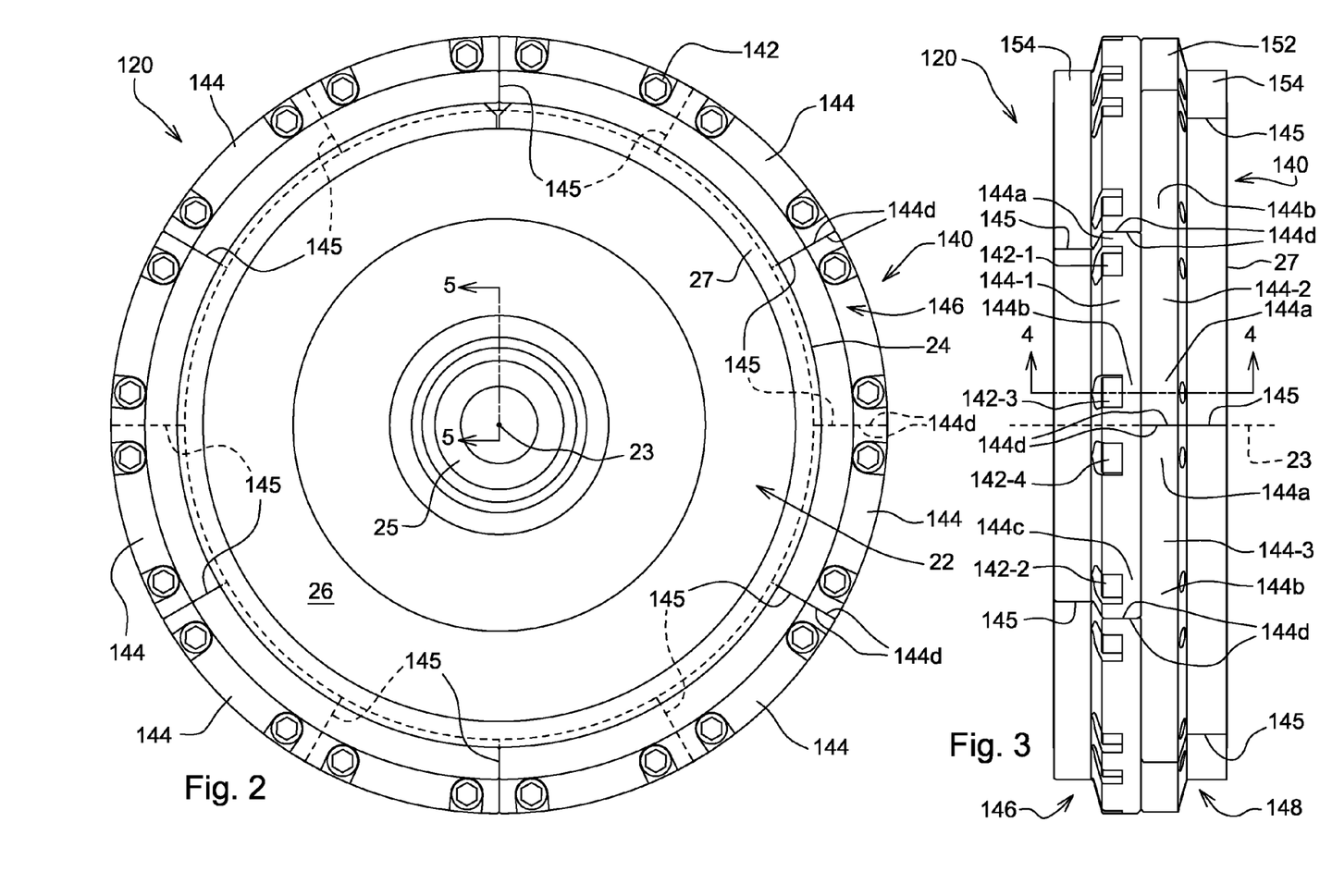
FIG. 2 is an enlarged side elevation view of a first embodiment of an idler for use with an endless track of the track-type vehicle.
FIG. 3 is an end elevation view of the idler of FIG. 2.

Referring to 1, there is a shown a track-type vehicle 10, illustrated, for example, as a simplified heavy-duty crawler dozer which can be conventional in form except with respect to its idlers 20 (one of which is shown diagrammatically in FIG. 1). The vehicle 10 includes an operator's station 12 from which a human operator can control functions of the vehicle 10. The undercarriage 13 of the vehicle 10 has a track 14 on each side of the vehicle 10 for propulsion and steering of the vehicle 10.

Each track 14 has an endless track chain 16 and ground-engaging shoes 17 mounted to the chain 16. The track 14 is trained about a rear drive sprocket 18 for driving the track 14, a front idler 20, and a number of rollers 21. Each of the sprocket 18, idler 20, and rollers 21 is adapted to engage the chain 16 as the chain 16, or, more generally, the track 14, advances through its closed-loop path. The chain 16 includes links and joints connecting the links. A track frame of the undercarriage 13 (track frame not shown) is attached to the base machine and is located between the drive sprocket 18 and the idler 20 within the track 14, and the idler 20 and the rollers 21 are attached to the track frame.

Each joint acts as a pivot between links attached to that joint. Other than with respect to the master links of the chain 16, there are typically four offset links attached to each joint, two of which are attached to that joint and a first adjacent joint and two of which are attached to that joint and a second adjacent joint. The links cooperate to provide the chain with a pair of rails. The shoes 17 are mounted to the links.

Although the vehicle 10 is illustrated as a crawler dozer, it will be appreciated that the embodiments 120 and 220 of the idler 20, discussed below, could be used on a wide variety of track-type vehicles. Further, a track-type vehicle may have more than one idler, such as a front idler and a rear idler in the case of, for example, an elevated drive sprocket.

Referring to FIGS. 2-5, the idler 20 may be embodied as an idler 120. The idler 120 is provided for use with the endless track 14, and comprises a wheel 22 rotatable about an axis 23 and an annular rim 140 adapted to engage the chain 16 of the track 14. The rim 140 includes fasteners 142 and replaceable wear pads 144 releasably mounted to and positioned about the periphery 24 of the wheel 22 using the fasteners 142 and arranged relative to one another to encircle, or at least partially encircle, the wheel 22. As such, when a pad 144 becomes worn, it can be replaced in the field with a fresh pad 144, without having to remove the track 14 from the idler 120.

The fasteners 142 are readily accessible from a side of the idler 140, that is, the side facing laterally outwardly from the vehicle 10, to facilitate removal of a worn or damaged pad 144 and thus the serviceability of the idler 140. More particularly, each of the fasteners 142 extends in its longitudinal dimension laterally relative to the wheel 22 (or, stated otherwise, axially relative to the axis 23). As such, the heads 142a of the fasteners 142 are positioned on the same side of the idler, for ready and quick access thereto by a person with a tool (e.g., air gun or hand wrench) to remove the fasteners 142 of the pad(s) 144 to be replaced or re-conditoned.

The wheel 22 has, for example, a conventional hub 25, a pair of steel side plates 26, and an annular wheel rim or flange 27 made of mild steel and fabricated from a flat section rolled and welded at and along its ends (ends of flange 27 shown at the top of flange as viewed in FIGS. 2 and 6) (weld not shown). The side plates 26 are welded to the hub 25 and the flange 27 along the seams therebetween (welds not shown). The hub 25 includes two halves welded together along the seam therebetween and is mountable for rotation about the axis 23 (see FIG. 5; welds not shown). The welding of the wheel 22 is accomplished in a conventional manner. None of the hub 25, side plates 26, and flange 27 is heat-treated. The periphery of the flange 27 defines the periphery 24 of the wheel 22, and is machined at its center to include an annular groove 28 therearound for mounting of the wear pads. The groove 28 is, for example, six millimeters deep and 30 millimeters wide. It is to be appreciated that the wheel 22 may take a wide variety of other forms.

The rim 140 includes a first ring 146 of wear pads 144 and a second ring 148 of wear pads 144. Although not identical, the wear pads of the two rings 144, 148 are similar to one another. The first and second rings 146, 148 are laterally adjacent to and mate against one another. The fasteners 142 fasten the wear pads 144 of the first ring 146 to the wear pads 144 of the second ring 146, thereby forming the rim 140. As such, the wear pads 144 of the first ring 146 and the wear pads 144 of the second ring 148 are interlocked using the fasteners 142, whereupon, in conjunction with the tongue-and-groove arrangement described below, the wear pads 144 of the first and second rings 146, 148 are mounted to the periphery 24 of the wheel 22.

The pads 144 of the first ring 146 are aligned with one another end-to-end circumferentially about the periphery 24 of the wheel 22, and the pads 144 of the second ring 148 are aligned with one another end-to-end circumferentially about the periphery 24 of the wheel 22. As such, the first ring 146 provides one side of the rim 140, and the second ring 148 provides the other side of the rim 140.

The pads 144 of the first ring 146 and the pads 144 of the second ring 148 mate so as to be flush against one another. As such, the rings 146, 148 cooperate to provide features of the rim 140, including a central annular tongue 150, for a tongue-and-groove arrangement with the wheel 22, and a central annular guide ridge 152, for guiding the chain 16 of the track 14 as the track 14 advances around the idler 140.

The first and second rings 146, 148 cooperate with the wheel 22 to provide a tongue-and-groove arrangement. The tongue-and-groove arrangement reinforces the rim 140 to withstand large side loads, due, for example, to vehicle turning, rocks or other material in the chain 16, etc.

Exemplarily, the wheel 22 comprises the groove 28, and the first and second rings 146, 148 cooperate to provide the tongue 150 received in the groove 28. The pads 144 of the first ring 146 provide an annular half of the tongue 150, and the pads 144 of the second ring 148 provide the other annular half of the tongue 150. The two halves mate against and are flush with one another to provide the tongue 150. In other embodiments, the two rings 146, 148 may cooperate to provide the groove while the flange 27 may be formed to provide the tongue received by the groove of the modified rim 140.

The first and second rings 146, 148 cooperate to provide the guide ridge 152. The pads 144 of the first ring 146 provide an annular half of the ridge 152, and the pads 144 of the second ring 148 provide the other annular half of the ridge 152. The two halves mate against and are flush with one another to provide the ridge 152.

Each ring 146, 148 provides a side deck 154. The decks 154 are positioned on opposite sides of the ridge 152 and extend laterally away from the base of the ridge 152. The rails of the chain 16 ride on the side decks 154 as the track 14 advances in its closed-loop path.

Each pad 144 of each ring 146, 148 is fastened to two wear pads 144 of the other ring 146, 148. Consider, for example, a pad 144-1 of the first ring 146 as representative of each pad 144. The pad 144-1 is fastened to the pads 144-2 and 144-3 of the second ring 148. More particularly, there are four fasteners associated with the pad 144-1, as with each pad 144.

The four fasteners 144 include a first end fastener 142-1, a second end fastener 142-2, a first intermediate fastener 142-3, and a second intermediate fastener 142-4. The first end fastener 142-1 is connected to a first end portion 144a of the wear pad 144-1 and an intermediate portion 144b of the wear pad 144-2. The second end fastener 142-2 is connected to a second end portion 144c of the wear pad 144-1 and an intermediate portion 144b of the wear pad 144-3. The first intermediate fastener 142-3 is positioned between the first and second end fasteners 142-1, 142-2 and is connected to an intermediate portion 144b of the wear pad 144-1 and a first end portion 144a of the wear pad 144-2. The second intermediate fastener 142-4 is positioned between the first and second end fasteners 142-1, 142-2 and is connected to the intermediate portion 144b of the wear pad 144-1 and a first end portion 144c of the wear pad 144-3 adjacent to the first end portion 144a of the wear pad 144-2. As such, each fastener 142 extends laterally in the ridge 152 from a wear pad 144 of one ring 146, 148 to a wear pad 144 of the other ring 146, 148.

The wear pads 144 of the first ring 146 and the wear pads 144 of the second ring 148 are arranged relative to one another in a manner that promotes the relative homogeneity of the rim 140. Ends 144d of circumferentially adjacent wear pads 144 of the first ring 146 cooperate to provide an interface 145 therebetween, and ends 144d of circumferentially adjacent wear-pads 144 of the second ring 148 cooperate to provide an interface 145 therebetween. The interfaces 145 of the first ring 146 are staggered circumferentially relative to the interfaces 145 of the second ring 148. Stated otherwise, the ends 144d of the wear pads 144 of the first ring 146 are circumferentially staggered relative to the ends 144d of the wear pads 144 of the second ring 148 such that the ends 144d of the wear pads 144 of one ring 146, 148 and the interfaces 145 of that ring are misaligned with the ends 144d of the wear pads 144 of the other ring 146, 148 and the interfaces 145 of that ring. There is thus no interface 145 between wear pads 144 extending laterally all the way from one side of the rim 140 to the other side of the rim 140. The interfaces 145 and the ends 144d of the pads 144 thus alternate between the rings 146, 148 circumferentially about the rim 140, so as to minimize stress concentrations along the rim. Such rim homogeneity promotes the rim's facilities for bearing loads and noise minimization.

The wear pads 144 of the two rings 146, 148 are identical, except with respect to the respective portions of the fastener-receiving apertures 156. Each pad 144 is configured as an elongated arcuate segment that includes a circumferential portion of half of the tongue 150, a circumferential portion of half of the ridge 152, and a circumferential portion of a deck 154. Each pad 144 is generally L-shaped in an end view of the pad 144 (see FIG. 4).

Figure 4:
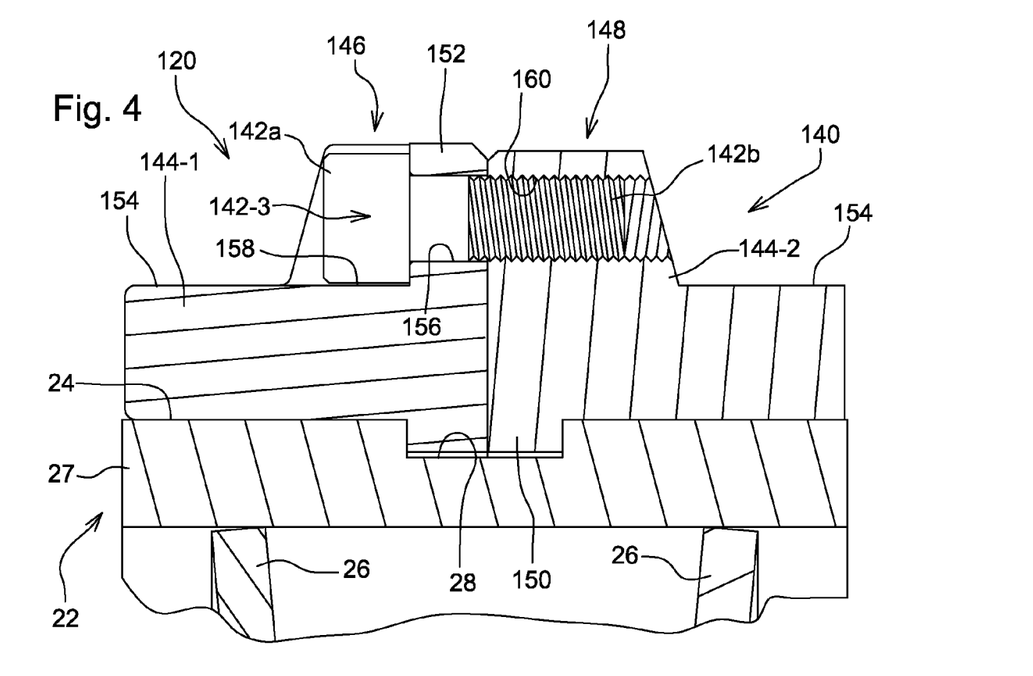
FIG. 4 is a sectional view taken along lines 4-4 of FIG. 3.
Figure 5:
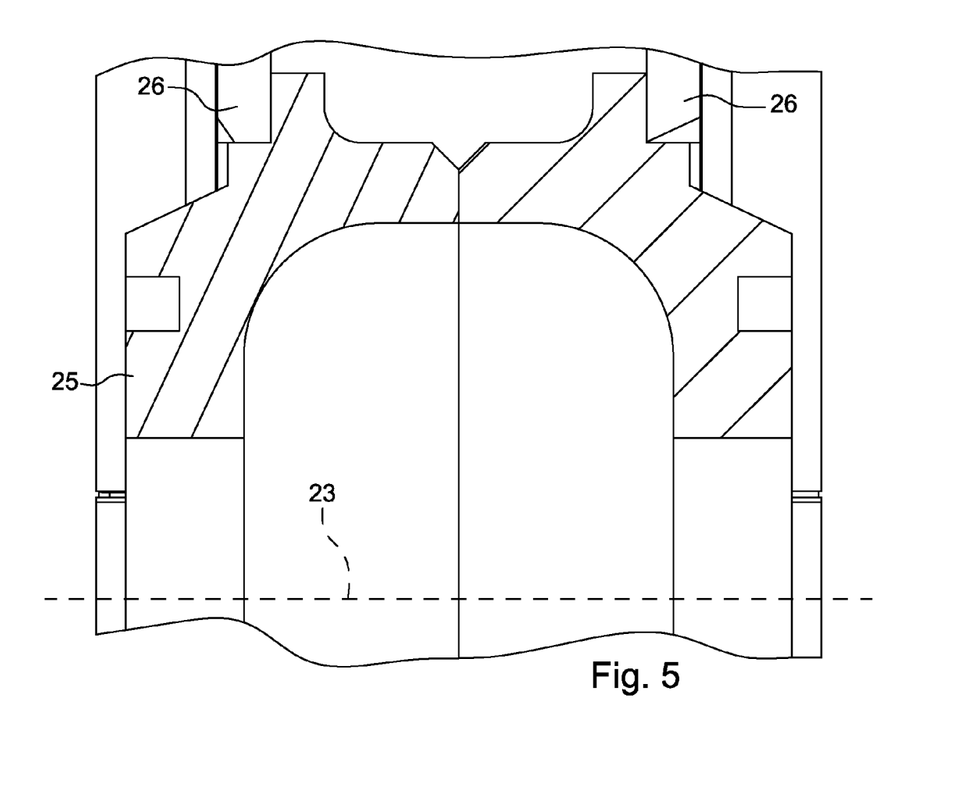
FIG. 5 is a sectional view taken along lines 5-5 of FIG. 2.
Figure 6:
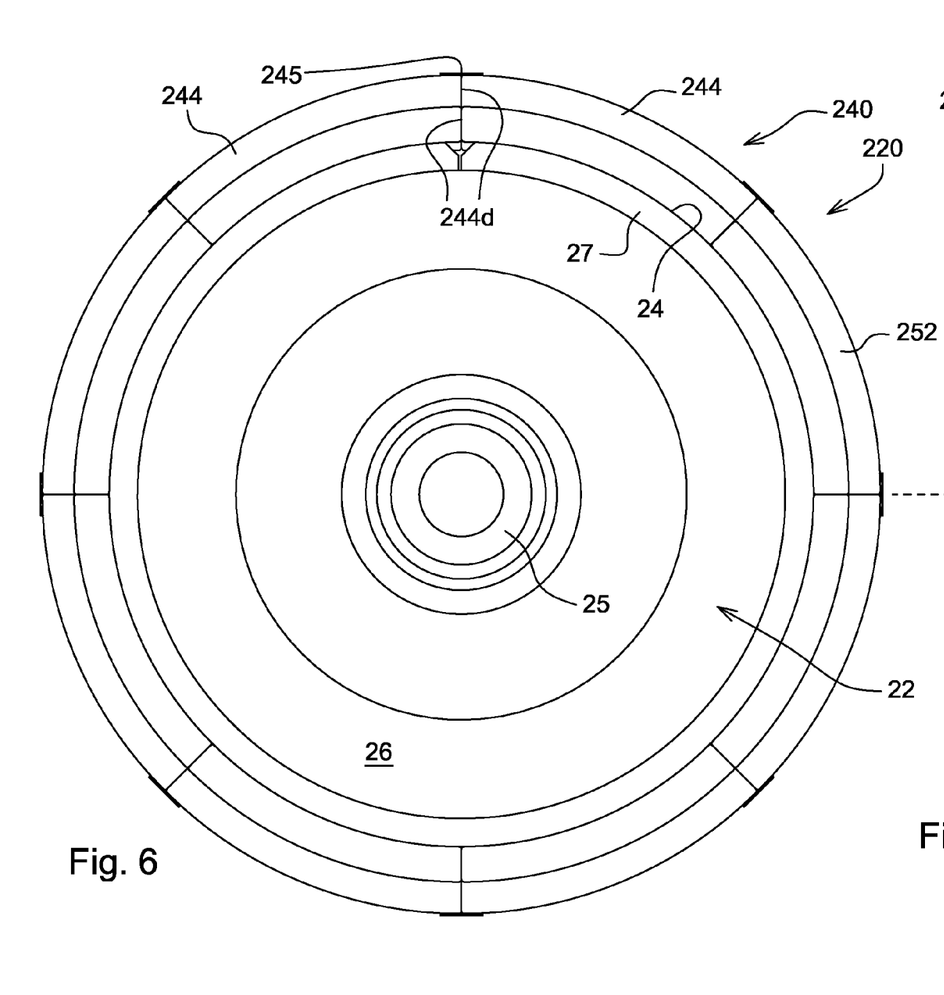
FIG. 6 is an enlarged side elevation view of a second embodiment of an idler for use with an endless track of the track-type vehicle.
Figure 7:
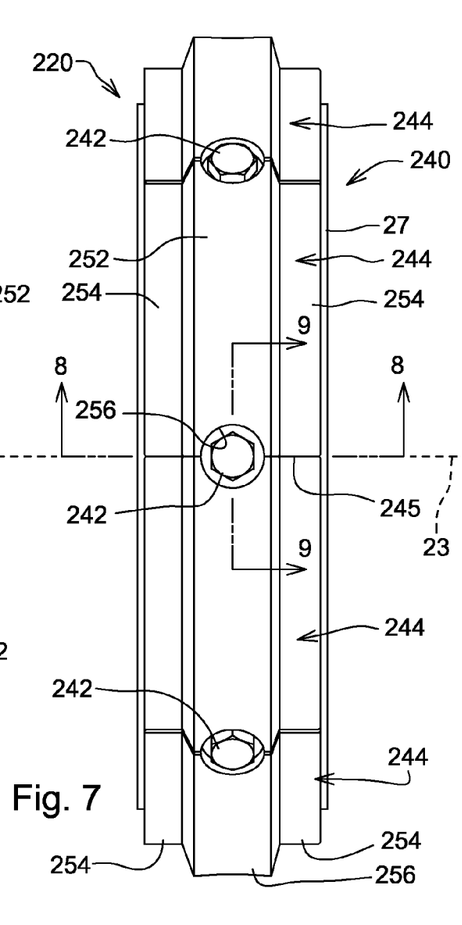
FIG. 7 is an end elevation view of the idler of FIG. 6.

Each fastener 142 fastens laterally adjacent pads 144. In so doing, the fastener 142 extends through a fastener-receiving aperture 156 cooperatively provided by such adjacent pads 144 and formed in the ridge 152. Each aperture 156 includes a counterbore 158 formed in the pad 144 of the first ring 146 and a bore 160 having a non-threaded portion formed in the pad 144 of the first ring 146 and a threaded portion formed in the pad 144 of the second ring 148. A head 142a of the fastener 144 is positioned within the counterbore 158, and a threaded shank 142b of the fastener 144 extends through the non-threaded portion of the bore 160 into the threaded portion of the bore 160. The fastener 142 is tightened to lock the pads 144 together.

When building the idler 120, the rim 140 is assembled to the wheel 22. To do so, a pad 144 of the first ring 146 and a pad 144 of the second ring 146 are placed on the periphery 24 of the flange 27 with their tongue portions positioned in the groove 28 and their tongue and ridge portions mating against one another. The two pads 144 are arranged relative to one another to define the apertures 156 associated therewith, and the fasteners 142 are inserted into the apertures 156 to fasten those pads 144 together. Similarly, another pad 144 is placed on the periphery 24 of the flange 27 in the second ring 146 and fastened to the pad 144 of the first ring 146. The next pad 144 to be mounted would be added to the first ring 146. Succeeding pads 144 are thus be added to the first and second rings 146, 148 in alternating fashion until the rim 140 is formed.

A worn or damaged pad 144 can be replaced by a fresh pad (e.g., new or re-conditioned) in the field or other locations. The fasteners 142 are readily accessible laterally from the side of the vehicle 10 and idler 120 to enhance the serviceability of the idler 140. Since the fasteners 142 extend in their longitudinal dimension laterally, their heads 142a are positioned on the same side of the idler 120 and its rim 140, for ready and quick lateral access thereto by a person with a tool (e.g., air gun or hand wrench) to remove the fasteners 142 of a worn or damaged wear pad 144, avoiding the need to access radially oriented fasteners at a potentially awkward angle and in a limited space within the track 14 that could be constrained even further by material packing.

The fasteners 142 associated with the pad 144 to be removed are withdrawn enough to allow removal of that pad 144. The pad 144 is then removed from the wheel 22. A fresh pad 144 is then inserted into the void on the wheel 22 and fastened to the two associated pads 144 of the other ring using the withdrawn fasteners 142 so as to mount the pad 144 to the wheel 22.

The idler 140 is thus readily and quickly serviceable. Further, since each pad 144 provides only a portion of the lateral width of the rim 140 (e.g., half), the weight of each pad 144 is minimized, making handling of the pads 144 easier. In addition, given the lateral size of each pad 144, wear in a particular area can be targeted more precisely, especially in instances of laterally imbalanced wear, such as where one ring may tend to experience more wear than the other ring.

Referring to FIGS. 6-9, the idler 20 may be embodied as an idler 220. The idler 220 is provided for use with the endless track 14, and comprises the wheel 22 and an annular rim 240 adapted to engage the chain 16 of the track 14. The rim 240 includes fasteners 242 and replaceable wear pads 244 releasably mounted to and positioned about the periphery 24 of the wheel 22 using the fasteners 242 and arranged relative to one another to encircle, or at least partially encircle, the wheel 22. As such, when a pad 244 becomes worn, it can be replaced in the field with a fresh pad 244, without having to remove the chain track 14 from the idler 220.

The pads 244 are aligned with one another end-to-end circumferentially about the periphery 24 of the wheel 22 to form the rim 240 as a ring. The pads 244 are configured and cooperate with one another to provide the rim 240 with a central annular tongue 250, for a tongue-and-groove arrangement with the wheel 22, a central annular guide ridge 252, for guiding the chain 16 of the track 14 as the track 14 advances around the idler 240, and a pair of side decks 254, on which the rails of the chain 16 ride as the track 14 advances in its closed-loop path. The side decks 254 are positioned on either side of the ridge 254 and extend laterally away from the base thereof.

The rim 240 cooperates with the wheel 22 to provide a tongue-and-groove arrangement. The tongue-and-groove arrangement reinforces the rim 240 to withstand large side loads, due, for example, to vehicle turning, rocks or other material in the chain 16, etc. Exemplarily, the wheel 22 comprises the groove 28, and the rim 240 provides the tongue 250 received in the groove 28. In other embodiments, the rim 240 may provide the groove while the flange 27 may be formed to provide the tongue received in the groove of the modified rim 240.

The wear pads 244 are identical. Each pad 244 is configured as an elongated arcuate segment that includes a circumferential portion of the tongue 250, a circumferential portion of the ridge 252, and circumferential portions of the two side decks 254. Each pad 244 is generally T-shaped in an end view of the pad 244 (see FIG. 7).

Each fastener 242 fastens two circumferentially adjacent pads 244. In so doing, the fastener 142 extends radially relative to the axis 23 through a washer 270 and a fastener-receiving aperture 256 that is formed in the ridge 252 and cooperatively provided by ends 244d of such adjacent pads 244. As such, each fastener 242 extends in and through a respective interface 245 between the circumferentially adjacent wear pads 244 and between the ends 244d of such pads 244 to the flange 27 of the wheel 22 to mount those ends 244d to the wheel 22.

Figure 8:
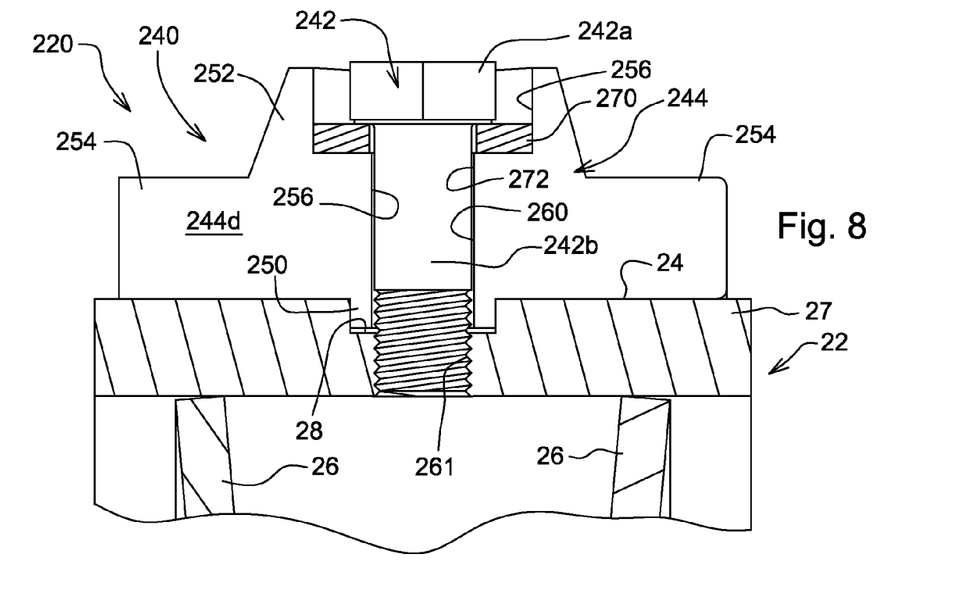
FIG. 8.*is* a sectional view taken along lines 8-8 of FIG. 7.
Figure 9:
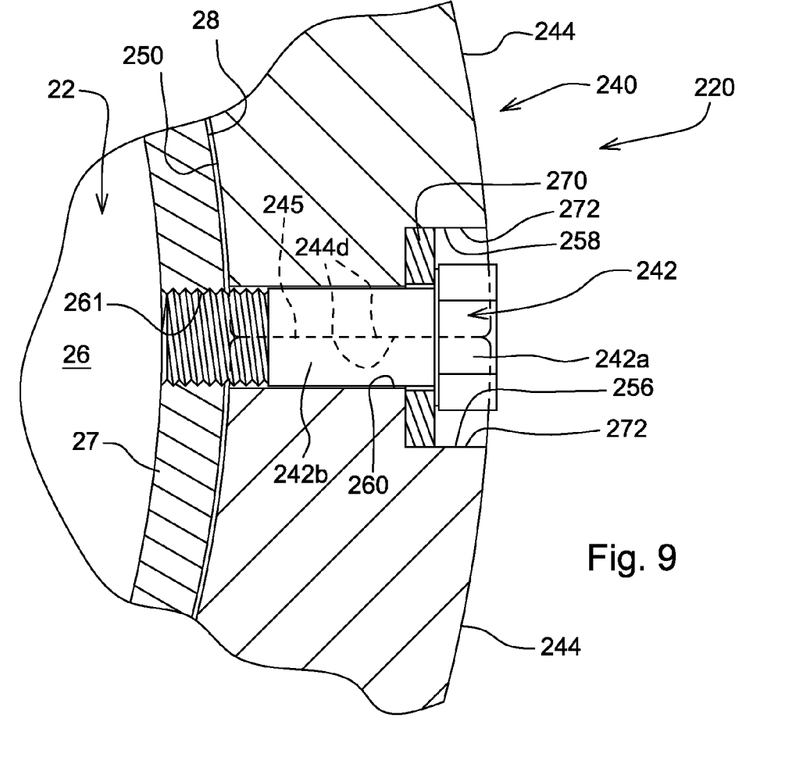
FIG. 9 is a sectional view taken along lines 9-9 of FIG. 7.

Each aperture 256 includes a counterbore 258 and a non-threaded bore 260. A head 242a of the fastener 244 and the associated washer 270 are positioned within the counterbore 258, and a threaded shank 242b of the fastener 244 extends through the bore 260 into a threaded aperture 261 drilled and tapped into the groove 28 of the flange 27 of the wheel 22. The fastener 242 is tightened to lock the ends 244d of the respective circumferentially adjacent pads 244 to the wheel 22.

Each end 244d of each pad 244 includes a recessed portion 272. The recessed portions 272 of circumferentially adjacent wear pads 244 cooperate to define one of the fastener-receiving apertures 256 extending radially through the rim 240 and the tongue 250 and ridge 252 thereof.

Thus, each fastener 242, as well as the associated washer 270, is associated with two circumferentially adjacent pads 244, to mount the adjacent ends 244d of such pads 244 to the wheel 22. The design of the rim 240 is thus efficient, in its economical use of the fasteners 242.

It is to be appreciated that additional fasteners 242, and associated washers 270, could be included with the rim 240, each fastener 242, as well as the associated washer 270, provided to fasten an intermediate portion 244b of a respective pad 244 to the flange 27 of the wheel 22. In such a case, each intermediate portion 244b could be formed to include an aperture 256 with a counterbore 258 and bore 260. The washer 270 is received in the counterbore 258, and the fastener 242 is received in the counterbore 258 and bore 260.

When building the idler 220, the rim 240 is assembled to the wheel 22. To do so, two pads 244 are placed on the periphery 24 of the flange 27 so as to be circumferentially adjacent to one another with their tongue portions positioned in the groove 28. The aperture 256 is defined by the ends 244*d* of the adjacent pads 244 and aligned with a fastener-receiving aperture 261 of the wheel 22. A fastener 242 and an associated washer 270 are inserted into the aperture 256, and the fastener 242 is screwed into the aperture 261. Each succeeding pad 244 is fastened to an adjacent pad 244 and the flange 27 in a similar manner to complete assembly of the rim 240 to the wheel 22.

A worn or damaged pad 244 can be replaced by a fresh pad 244 (e.g., new or re-conditioned) in the field or other locations. Since the fasteners 242 extend radially relative to the wheel 22 and its axis 23, a tool (e.g., air gun or hand wrench) or portion thereof would be inserted into a space about the idler 220 within the track 14. The fasteners 242 associated with the pad 244 to be removed are withdrawn from the wheel 22, and the pad 244 is removed from the wheel 22. A fresh pad 244 is then inserted into the void on the wheel 22 and fastened to the wheel 22 between the two circumferentially adjacent pads 244 using the withdrawn fasteners 242.

Each pad 144, 244 would be made of a draw-forged hardened alloy steel (e.g., boron-based alloy steel). Each pad 144, 244 would be hardened by heat treatment (e.g., involving multiple wear pads in an oven). More particularly, all the surfaces of each pad 144, 244 are heat-treated and carburized, such as the external surfaces and the internal surfaces, the external surfaces including each top deck surface having a hardness level of 48 to 54 HRC (Hardness Rockwell C) and the inclined and top ridge and side deck surfaces having a hardness level of 45 to 50 HRC, and the internal surfaces including the bottom surfaces having a hardness level of about 45 HRC and, in the case of the pads 144, the side surface (that mates with the side surface of a laterally adjacent pad 144) having a hardness level of about 45 HRC, leaving a core having a hardness level of 35 to 40 HRC. In this way, each rim 140, 240 is provided with a relatively deep heat-treated zone around the rim 140, 240, maximizing rim life, unlike prior art idler rims in which only the external surfaces thereof are heat-treated via induction hardening creating a limited heat-treat depth.

While the disclosure has been illustrated and described in detail in the drawings and foregoing description, such illustration and description are to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. An idler for use with an endless track of a track-type vehicle, the idler comprising:
    a wheel, and
    a rim comprising fasteners and replaceable wear pads releasably mounted to and positioned about the periphery of the wheel using the fasteners, each of the fasteners extending in its longitudinal dimension laterally relative to the wheel, wherein laterally adjacent wear pads mate against one another to provide a circumferential portion of an annular tongue extending into an annular groove included in the Periphery of the wheel.

2. The idler of claim 1, wherein each of the fasteners comprises a head, and the heads of the fasteners are positioned on the same side of the idler.

3. The idler of claim 2, wherein each of the fasteners is a cap screw.

4. The idler of claim 1, wherein each of the fasteners fastens laterally adjacent wear pads to one another.

5. The idler of claim 1, wherein the wear pads comprise a first ring of wear pads and a second ring of wear pads laterally adjacent to and mating against the first ring of wear pads, and the first and second rings are fastened to one another using the fasteners.

6. The idler of claim 5, wherein each of the fasteners extends laterally from the first ring to the second ring.

7. An idler for use with an endless track of a track-type vehicle, the idler comprising:
    a wheel, and
    a rim comprising replaceable wear pads releasably mounted to and positioned about the periphery of the wheel, the wear pads arranged as a first ring of wear pads and a second ring of wear pads, the first and second rings laterally adjacent to and mating against one another, wherein the first and second rings cooperate with the wheel to provide a tongue-and-groove arrangement comprising an annular groove and an annular tongue received in the groove.

8. The idler of claim 7, wherein circumferentially adjacent wear pads of the first ring cooperate to provide an interface therebetween, circumferentially adjacent wear pads of the second ring cooperate to provide an interface therebetween, and the interfaces of the first ring are staggered circumferentially relative to the interfaces of the second ring.

9. The idler of claim 7, wherein the wheel comprises the groove, and the first and second rings cooperate to provide the tongue received in the groove.

10. The idler of claim 7, wherein the rim comprises fasteners, and the wear pads of the first ring and the wear pads of the second ring are interlocked using the fasteners whereupon the wear pads of the first and second rings are mounted to the periphery of the wheel.

11. The idler of claim 7, wherein the rim comprises fasteners, and each of the fasteners extends laterally from the first ring to the second ring.

12. An idler for use with an endless track of a track-type vehicle, the idler comprising:
    a wheel, and
    a rim comprising replaceable wear pads releasably mounted to and positioned about the periphery of the wheel, the wear pads arranged as a first ring of wear pads and a second ring of wear pads, the first and second rings laterally adjacent to and mating against one another, wherein the first and second rings cooperate to provide an annular guide ridge for the endless track.

13. The idler of claim 12, wherein the rim comprises fasteners, and the fasteners extend in the guide ridge from the first ring to the second ring to fasten the wear pads of the first ring to the wear pads of the second ring.

14. The idler of claim 12, wherein each wear pad of each of the first and second rings is fastened to two wear pads of the other of the first and second rings.

15. The idler of claim 14, wherein:
    the rim comprises fasteners, and
    with respect to each wear pad of each of the first and second rings, the fasteners associated with that wear pad comprise:

a first end fastener connected to a first end portion of that wear pad and an intermediate portion of a first wear pad of the other ring, a second end fastener connected to a second end portion of that wear pad and an intermediate portion of a second wear pad of the other ring, a first intermediate fastener positioned between the first and second end fasteners and connected to an intermediate portion of that wear pad and a first end portion of the first wear pad, and a second intermediate fastener positioned between the first and second end fasteners and connected to the intermediate portion of that wear pad and a first end portion of the second wear pad adjacent to the first end portion of the first wear pad.

* * * * *